Oct. 22, 1957 H. A. STORCH 2,810,603
WINDHOSE AND RETAINING MEANS
Filed April 25, 1955
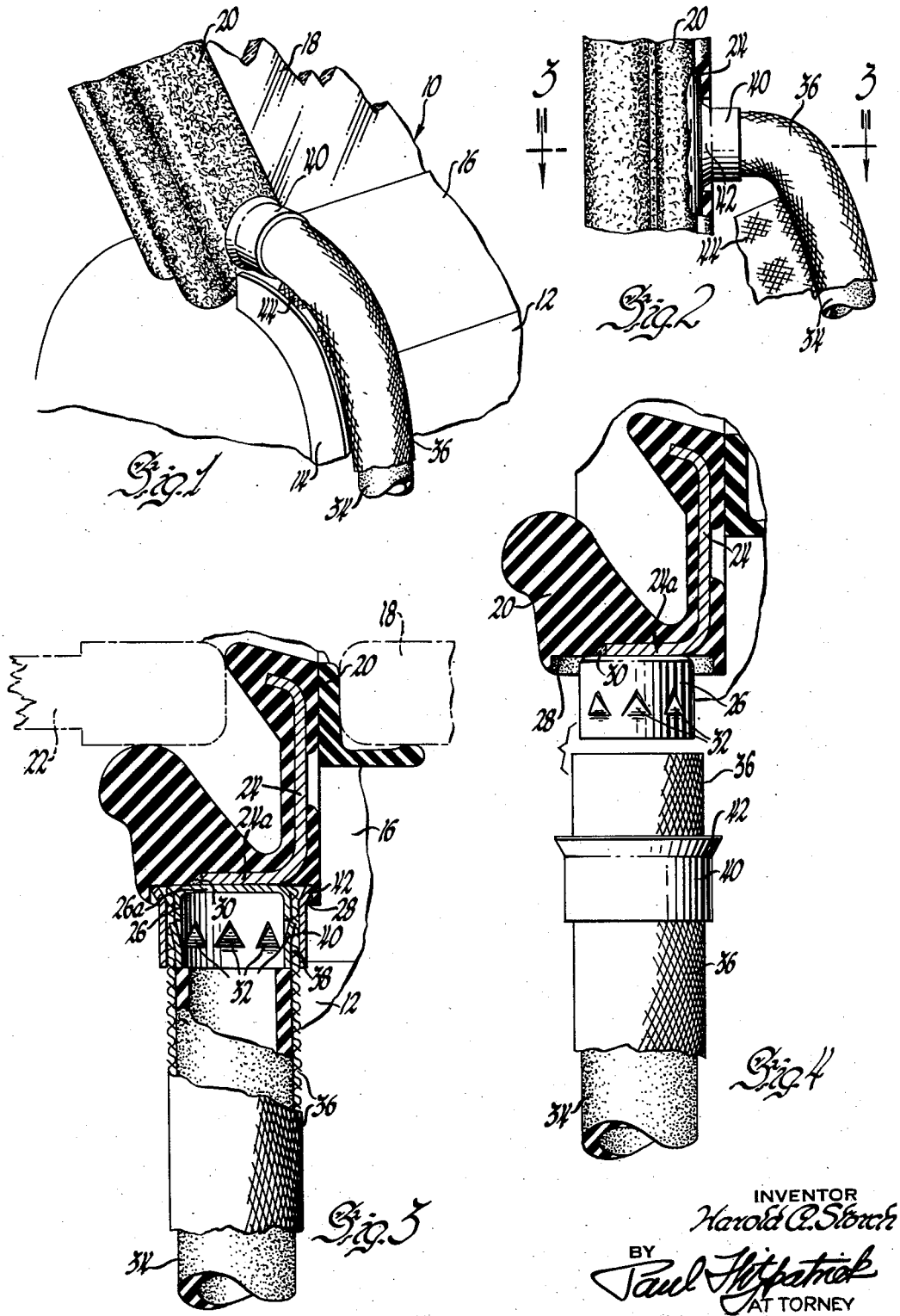
INVENTOR
Harold A. Storch
BY Paul Fitzpatrick
ATTORNEY United States Patent Office 2,810,603
Patented Oct. 22, 1957

2,810,603

WINDHOSE AND RETAINING MEANS

Harold A. Storch, Birmingham, Mich., assignor to General Motors Corporation, Detroit, Mich., a corporation of Delaware Application April 25, 1955, Serial No. 503,711

10 Claims. (Cl. 296—44)

This invention relates to a windhose and retaining means therefor, and more particularly to a windhose mounted on the door of a vehicle.

One feature of the invention is that it provides an improved windhose and improved retaining means therefor; another feature of the invention is that it provides novel means for mounting a windhose on a frameless automobile door; a further feature of the invention is that the windhose, which comprises an elongated sealing member has a flexible cover with an end portion projecting beyond the end of the sealing member, and a retainer on the door fits snugly within the end portion of the cover and is clamped thereon; still another feature of the invention is that the retainer is mounted on a weatherstrip which defines an upper vertical edge portion of the door; and yet a further feature of the invention is that a slidable clamping sleeve on the cover holds the cover on the retainer, the retainer having outwardly projecting barbs for gripping the cover.

Other features and advantages of the invention will be apparent from the following description and from the drawings, in which:

Fig. 1 is an inside perspective view of a portion of an automobile door having the improved windhose and retaining means;

Fig. 2 is a fragmentary elevational view looking from the left of Fig. 1;

Fig. 3 is an enlarged transverse section through the door weatherstrip taken along the line 3—3 of Fig. 2 and showing the windhose and retaining means partly in section; and Fig. 4 is a transverse section through the door weatherstrip, being similar to Fig. 3 but showing the windhose removed from the retainer.

In conventional automobile body construction a windhose is mounted on the body along the inside edges of the door openings to provide sealing means at the door edges. Often it is desirable to mount the windhose on the door rather than on the body, and in fact, in pillarless body constructions, there is no place at the center of the body to mount the windhose. This invention provides a novel and improved windhose retaining means, wherein the windhose is mounted on the door and the end of the windhose is retained in place by a simple coupling means including a retainer carried by the door weatherstrip of a frameless door.

Referring now more particularly to the drawings, a door designated generally as 10 has an inner door panel 12 which generally is covered with upholstery (not shown). At the edge of the door panel a molding strip 14 clamps the upholstery onto the door panel. At the top of the panel 12 the door has a garnish molding 16 through which a window 18 slides. The door illustrated is a frameless door of the so-called convertible type, and a door weatherstrip 20 defines the vertical edge of the door above the garnish molding and provides sealing means for an adjacent window 22. As shown in Figs. 3 and 4, the weatherstrip 20, which is formed of rubber, has an L-shaped metal stiffening insert 24 molded within its rubber body portion. As shown in Figs. 3 and 4, a cup-shaped retainer sleeve 26 is mounted on the weatherstrip 20 in an opening 28 cut in the rubber body of the weatherstrip. The base 26a of the cup-shaped retainer is welded, as shown at 30, to the base portion 24a of the L-shaped metal stiffener 24. Around the walls of the cup-shaped retainer 26 a plurality of barbs 32 are punched outwardly. As may be seen in Figs. 3 and 4, these barbs are triangular in shape with the points facing toward the door weatherstrip 20.

The windhose comprises an elongated sealing member formed of a rubber tube 34 having a flexible fabric cover 36. Referring particularly to Fig. 3, it will be seen that the cover 36 has an end portion 38 which projects beyond the end of the rubber tube 34 for a distance substantially equal to the depth of the walls of the cup-shaped retainer 26. A clamping sleeve 40 is slidably mounted on the cover 36, the sleeve having an outwardly flared front end 42 for facilitating movement of the sleeve from the position shown in Fig. 4 to the position shown in Fig. 3. In order to mount the windhose on the retainer 26, the projecting end portion 38 of the cover is slid over the retainer, which fits snugly therein so that the barbs 32 grip the cover as shown in Fig. 3. The clamping sleeve 40 is then slid over the retainer as shown in Fig. 3, the flared forward end 42 facilitating movement of the clamping sleeve over the barbs. The pressure of the clamping sleeve forces the barbs 32 into the fabric cover so that the windhose is firmly mounted on the door weatherstrip.

Along the length of the windhose, the fabric cover is formed with a flange 44 which is clamped to the edge of the door by the molding 14. The mounting means for the lower end of the windhose may be conventional and is not shown.

If it is desired to disassemble the windhose from the retainer, it is merely necessary to slide the clamping sleeve 40 back along the cover 36 to the location shown in Fig. 4 so that the cover can be removed from the cup-shaped retainer.

While I have shown and described one embodiment of my invention, it is capable of many modifications. Changes, therefore, in the construction and arrangement may be made without departing from the spirit and scope of the invention as set forth in the appended claims.

I claim:

1. Apparatus of the character described, including: an elongated sealing member; a flexible cover on said member, said cover having an end portion projecting beyond the end of said member along an extension of the axis thereof; a retainer adapted to fit within the projecting end portion of said cover; and clamping means on said cover for holding the cover on the retainer.

2. Apparatus of the character described, including: an elongated sealing member; a flexible cover encasing said member, said cover having an end portion projecting beyond the end of said member; a retainer adapted to fit within the projecting end portion of said cover beyond the end of said member, said retainer having at least one outwardly projecting barb for gripping the cover; and clamping means on said cover for holding the cover on the retainer.

3. A windhose and mounting means of the character described, including, in combination, an elongated sealing member; a flexible cover encasing said member, said cover having an end portion projecting beyond the end of said member along an extension of the axis thereof; a retainer adapted to fit within the projecting end portion of said cover beyond the end of said member, said retainer having a plurality of outwardly projecting barbs for gripping said cover; and a slidable clamping sleeve on said cover for holding the cover on the retainer.

4. A windhose and mounting means of the character described, including, in combination, an elongated sealing member which is circular in cross-section; a flexible cover encasing said member, said cover having an end portion projecting beyond the end of said member; a retainer sleeve adapted to fit within the projecting end portion of said cover beyond the end portion of said cover, said sleeve having a plurality of outwardly projecting barbs for gripping the cover; and a slidable clamping sleeve on said cover for holding the cover on the retainer.

5. A windhose and mounting means of the character described, including, in combination, an elongated sealing member comprising a flexible tube which is circular in cross-section; a flexible fabric cover encasing said tube, said cover having an end portion projecting beyond the end of said tube along an extension of the axis thereof; a retainer sleeve adapted to fit snugly within the projecting end portion of said cover beoynd the end portion of the sealing member, said sleeve having a plurality of outwardly projecting barbs for gripping the cover; and a slidable clamping sleeve on the cover for holding the cover on the retainer.

6. In combination with a frameless automobile door having a lower panel and an upper vertical edge portion above the panel defined by a weatherstrip, apparatus of the character described, including: an elongated sealing member having a flexible cover with an end portion projecting beyond the end of said member; means for mounting said sealing member on the door along the edge of said panel; a retainer mounted on the weatherstrip adjacent the upper edge of the panel, said retainer being adapted to fit within the projecting end portion of said cover; and clamping means on said cover for holding the cover on the retainer.

7. In combination with a frameless automobile door having a lower panel and an upper vertical edge portion above the panel defined by a weatherstrip, apparatus of the character described, including: an elongated sealing member having a flexible cover with an end portion projecting beyond the end of said member; means for mounting said sealing member on the door along the edge of said panel; a retainer mounted on the weatherstrip adjacent the upper edge of the panel, said retainer being adapted to fit snugly within the projecting end portion of said cover and said retainer having at least one outwardly projecting barb for gripping the cover; and slidable clamping means on said cover for holding the cover on the retainer.

8. In combination with a frameless automobile door having a lower panel and an upper vertical edge portion above the panel defined by a weatherstrip, apparatus of the character described, including: an elongated sealing member having a flexible cover with an end portion projecting beyond the end of said member; means for mounting said sealing member on the door along the edge of said panel, said means comprising an integral flange on the cover adapted to be clamped along the edge of the panel; a retainer mounted on the weatherstrip adjacent the upper edge of the panel, said retainer being adapted to fit snugly within the projecting end portion of the cover and said retainer having a plurality of outwardly projecting barbs for gripping the cover; and a slidable clamping sleeve on said cover for holding the cover on the retainer.

9. In combination with a frameless automobile door having a lower panel and an upper vertical edge portion above the panel defined by a weatherstrip, apparatus of the character described, including: an elongated sealing member having a flexible cover with an end portion projecting beyond the end of said member; means for mounting said sealing member on the door along the edge of said panel, said means comprising an integral flange on the cover adapted to be clamped along the edge of the panel; a retainer sleeve mounted on the weatherstrip adjacent the upper edge of the panel, said sleeve fitting snugly within the projecting end portion of said cover and said sleeve having a plurality of outwardly projecting barbs for gripping the cover; and a slidable clamping sleeve on said cover for holding the cover on the retainer.

10. In combination with a frameless automobile door having a lower panel and an upper vertical edge portion above the panel defined by a weatherstrip, apparatus of the character described, including: an elongated sealing member comprising a flexible rubber tube of circular transverse cross-section having a flexible fabric cover with an end portion projecting beyond the end of the tube; means for mounting said sealing member on the door along the edge of said panel, said means comprising an integral flange on the cover adapted to be clamped along the edge of the panel; a retainer sleeve mounted on the weatherstrip adjacent the upper edge of the panel, said sleeve fittingly snugly within the projecting end portion of said cover and said sleeve having a plurality of outwardly projecting barbs for gripping the cover; and a slidable clamping sleeve on said cover for holding the cover on the retainer.

References Cited in the file of this patent
UNITED STATES PATENTS

| | | |
|---|---|---|
| 186,855 | Leland | Jan. 30, 1877 |
| 589,216 | McKee | Aug. 31, 1897 |
| 2,536,863 | Widman | Jan. 2, 1951 |